(12) United States Patent
Mizuno et al.

(10) Patent No.: US 10,530,037 B2
(45) Date of Patent: Jan. 7, 2020

(54) ANTENNA DEVICE

(71) Applicant: YOKOWO CO., LTD., Kita-ku, Tokyo (JP)

(72) Inventors: Hirotoshi Mizuno, Tomioka (JP); Kentaro Hayashi, Tomioka (JP); Masayuki Goto, Tomioka (JP)

(73) Assignee: YOKOWO CO., LTD., Tokyo (JP)

(*) Notice: Subject to any disclaimer, the term of this patent is extended or adjusted under 35 U.S.C. 154(b) by 0 days.

(21) Appl. No.: 15/755,784

(22) PCT Filed: Dec. 18, 2015

(86) PCT No.: PCT/JP2015/085537
§ 371 (c)(1),
(2) Date: Feb. 27, 2018

(87) PCT Pub. No.: WO2017/046971
PCT Pub. Date: Mar. 23, 2017

(65) Prior Publication Data
US 2019/0036198 A1  Jan. 31, 2019

Related U.S. Application Data

(60) Provisional application No. 62/218,251, filed on Sep. 14, 2015.

(51) Int. Cl.
*H01Q 1/32* (2006.01)
*H01Q 1/22* (2006.01)
*H01Q 1/52* (2006.01)

(52) U.S. Cl.
CPC .............. *H01Q 1/22* (2013.01); *H01Q 1/32* (2013.01); *H01Q 1/52* (2013.01)

(58) Field of Classification Search
CPC ............ H01Q 1/22; H01Q 23/00; H01Q 9/40; H01Q 9/36; H01Q 1/3275; H01Q 1/42; H01Q 1/32; H01Q 1/52

(Continued)

(56) References Cited

U.S. PATENT DOCUMENTS 7,639,202 B2 * 12/2009 Takaoka ............... H01Q 1/1207
343/895
7,859,467 B2 * 12/2010 Imano ................... H01Q 1/245
343/702

(Continued)

FOREIGN PATENT DOCUMENTS

JP   H06-041219 U   5/1994
JP   2004-299511 A  10/2004

(Continued)

OTHER PUBLICATIONS

International Search Report dated Jan. 19, 2016, for corresponding International Patent Application No. PCT/JP2015/085537.

(Continued)

*Primary Examiner* — Jean B Jeanglaude
(74) *Attorney, Agent, or Firm* — Morgan, Lewis & Bockius LLP

(57) ABSTRACT

An antenna device capable of suppressing influence on an antenna performance even if an electronic device is provided in its vicinity is provided. An antenna device 1 is equipped with a top element 30 and a coil 40. A casing 51 of a camera 50 is disposed at such a position as not to be right under the top element 30. The coil 40 is disposed close to the casing 51 in a front-rear direction. A distance between the casing 51 and the coil 40 in the front-rear direction is longer than or equal to 0.00075 times a shortest wavelength of a reception target signal. A maximum antenna efficiency of the antenna device 1 in a predetermined frequency band is higher than or equal to 85% of a maximum antenna efficiency in a case where the camera 50 is not provided.

20 Claims, 16 Drawing Sheets

(58) Field of Classification Search
USPC .......................................................... 343/713
See application file for complete search history.

(56) References Cited

U.S. PATENT DOCUMENTS

| | | |
|---|---|---|
| 2010/0013724 A1 | 1/2010 | Ohshima et al. |
| 2010/0302113 A1* | 12/2010 | Sugimoto ............ H01Q 1/1271 |
| | | 343/713 |
| 2012/0026050 A1 | 2/2012 | Sampo et al. |
| 2014/0010524 A1* | 1/2014 | Clark ....................... G03B 9/70 |
| | | 396/56 |
| 2017/0028936 A1* | 2/2017 | Matsumoto ............. B60R 11/04 |
| 2017/0214130 A1* | 7/2017 | Grimes ................ H01Q 1/3275 |

FOREIGN PATENT DOCUMENTS

| | | |
|---|---|---|
| JP | 2009-135741 A | 6/2009 |
| JP | 2014-150496 A | 8/2014 |

OTHER PUBLICATIONS

Written Opinion of the International Searching Authority dated Jan. 19, 2016, for corresponding International Patent Application No. PCT/JP2015/085537.
Extended European Search Report dated Apr. 4, 2019 in corresponding EP Application No. 15904155.7.

* cited by examiner

1: ANTENNA DEVICE

1: ANTENNA DEVICE

1: ANTENNA DEVICE

1: ANTENNA DEVICE

1: ANTENNA DEVICE

1: ANTENNA DEVICE

2: ANTENNA DEVICE

2: ANTENNA DEVICE

3: ANTENNA DEVICE

3: ANTENNA DEVICE

3: ANTENNA DEVICE

3: ANTENNA DEVICE

3: ANTENNA DEVICE

ANTENNA DEVICE

TECHNICAL FIELD

The present invention relates to an antenna device to be attached to a roof or the like of a vehicle.

BACKGROUND ART

An antenna called a shark fin antenna has recently been developed. For example, a combination of a capacitance element (top element) and a coil is now used as an antenna element for receiving AM/FM broadcast broadly. The following Patent document 1 discloses a vehicular camera device which shoots a scene above is attached to a casing of an antenna device.

PRIOR ART DOCUMENTS

Patent Documents

Patent document 1: JP-A-2014-150496

SUMMARY OF THE INVENTION

Problems to Be Solved by the Invention

In recent years, techniques for sensing a situation around a vehicle becomes treated as important, as techniques used for autonomous driving, drive assistance or the like, and an electronic device for sensing has come to be installed increasingly frequently. However, when an electronic device for sensing is installed in a vehicle compartment, it may be attached taking into consideration matters which do not directly relate to a main function of the electronic device, such as an operation of the vehicle, a comfortability and a convenience of sitting inside, or the like. Thus, an installation conditions which are most suitable for the intrinsic function and the use (e.g., taking of an image by a camera) of the electronic device are not necessarily satisfied. On the other hand, if the electronic device is simply attached on the roof of the vehicle in a vicinity of an antenna, even when an arrangement is suitable for the intrinsic function and the use of the electronic device, a problem arises that a performance of a reception of a radio that is the original function that should be realized by the antenna is lowered because an addition of a metal object that was not taken into consideration at a time of original designing varies the antenna performance.

The present invention has been made in view of the above circumstances, and an object of the present invention is therefore to provide an electronic device capable of suppressing influence on the antenna performance even if an electronic device is provided in its vicinity.

Means for Solving the Problems

An aspect of the present invention is an antenna device. The antenna device includes a top element and a wavelength shortening element disposed below the top element, a casing of an electronic device is disposed at such a position as not to be right under the top element, the wavelength shortening element is disposed close to the casing in a predetermined direction that is perpendicular to the vertical direction, and a maximum antenna efficiency in a predetermined frequency band is higher than or equal to 85% of maximum antenna efficiency in a case where the electronic device is not provided.

Another aspect of the present invention is an antenna device. The antenna device includes a top element and a wavelength shortening element disposed below the top element, a casing of an electronic device is disposed at such a position as not to be right under the top element, the wavelength shortening element is disposed close to the casing in a predetermined direction that is perpendicular to the vertical direction, and a distance between the casing and the wavelength shortening element in the predetermined direction is longer than or equal to 0.00075 times a shortest wavelength of a reception target signal.

Still another aspect of the present invention is an antenna device. The antenna device includes a top element and a wavelength shortening element disposed below the top element, at least a part of a casing of an electronic device is disposed right under the top element, the wavelength shortening element is disposed so as to be spaced from the casing by a predetermined distance in a predetermined direction that is perpendicular to the vertical direction, and a maximum antenna efficiency in a predetermined frequency band is higher than or equal to 85% of maximum antenna efficiency in a case where the electronic device is not provided.

Yet another aspect of the present invention is an antenna device. The antenna device comprises:

a top element and a wavelength shortening element disposed below the top element, at least a part of a casing of an electronic device is disposed right under the top element, the wavelength shortening element is disposed so as to be spaced from the casing by a predetermined distance in a predetermined direction that is perpendicular to the vertical direction, and the distance between the casing and the wavelength shortening element in the predetermined direction is longer than or equal to 0.0023 times a shortest wavelength of a reception target signal.

A further aspect of the present invention is an antenna device. The antenna device comprises:

a top element and a wavelength shortening element disposed below the top element, and the top end of the wavelength shortening element is located above that of a casing of an electronic device, and a bottom end of the wavelength shortening element is located above that of the casing.

The antenna device may be such that:

the casing is disposed at such a position as not to be right under the top element, the wavelength shortening element is disposed close to the casing in a predetermined direction that is perpendicular to a vertical direction, an overlap length of the wavelength shortening element and the casing of the electronic device in the height direction is shorter than or equal to 0.0038 times a shortest wavelength of a reception target signal, and the distance between the casing and the wavelength shortening element in the predetermined direction is longer than or equal to 0.00030 times the shortest wavelength of the reception target signal.

The wavelength shortening element may be located at or closer to the casing than a position right under a central portion of the top element.

The casing may be made of a metal.

Any combination of the above constituent elements and an expression of the present invention as converted between a method, a system, etc. are also effective aspects of the present invention.

Advantages of the Invention

According to the present invention, it is possible to provide an antenna device capable of suppressing influence on the antenna performance even if an electronic device is provided in its vicinity.

MODES FOR CARRYING OUT THE INVENTION

Figure 1:
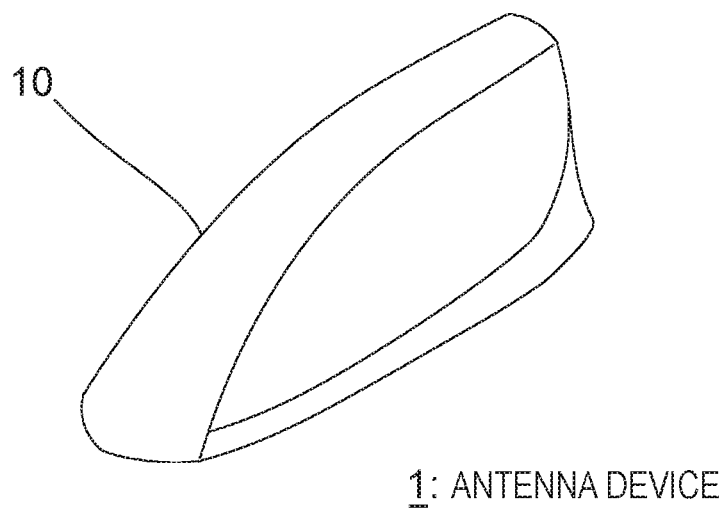
FIG. 1 is a perspective view, as viewed from a front side, of an antenna device 1 according to a first embodiment of the present invention.
Figure 2:
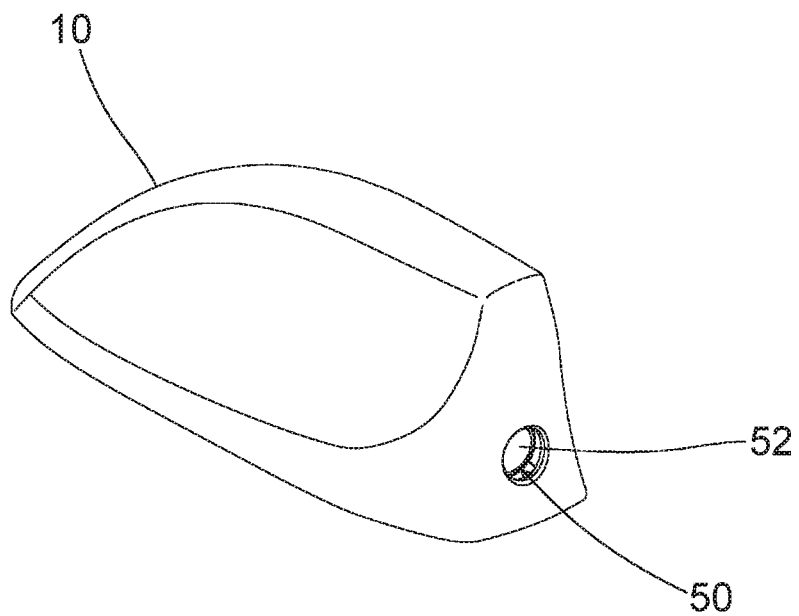
FIG. 2 is a perspective view, as viewed from a rear side, of the antenna device 1 according to the first embodiment of the present invention.

Preferred embodiments of the present invention will be hereinafter described in detail with reference to the drawings. The same or equivalent of constituent elements, members, steps, or the like shown in the drawings will be given the same symbols and redundant descriptions therefor will be omitted as appropriate. The embodiments are examples and are not intended to restrict the invention, and all features described in the embodiments and combinations thereof are not necessarily essential ones of the invention.

Embodiment 1

A first embodiment of the present invention will be described with reference to FIGS. 1-11. The front, rear, top, and bottom directions are defined in FIG. 7. An antenna device 1 according to the embodiment is a vehicular antenna device and is to be attached to, for example, a roof of a vehicle. In the antenna device 1, an outer case 10 is made of a synthetic resin (a mold of such a resin as polycarbonate or polyethylene terephthalate) through which radio waves is transmissive and both side surfaces are curved inward (called a shark fin shape). The outer case 10 is attached to (locked on) an antenna base 80 by, for example, engagement between claws.

Figure 3:
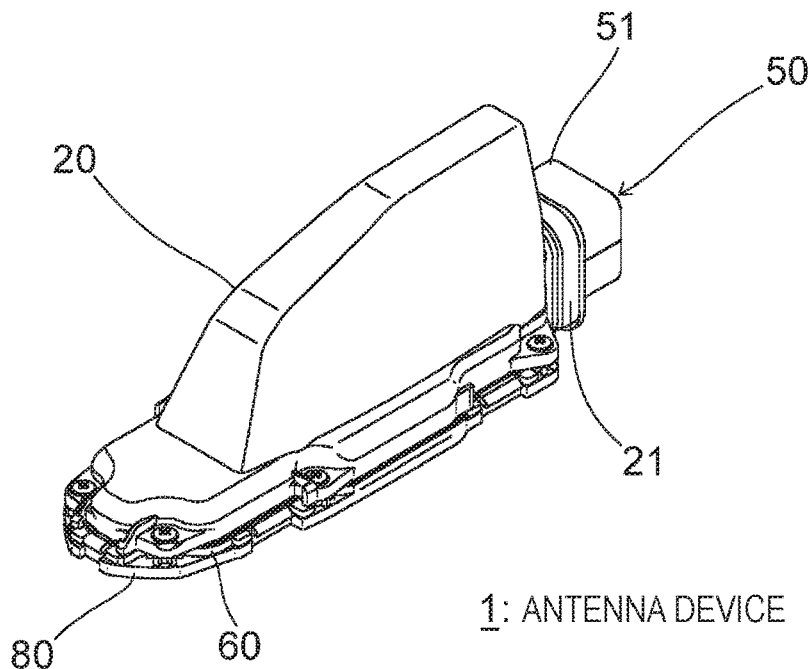
FIG. 3 is a perspective view, as viewed from the front side, of the antenna device 1 in which an outer case 10 is omitted.
Figure 4:
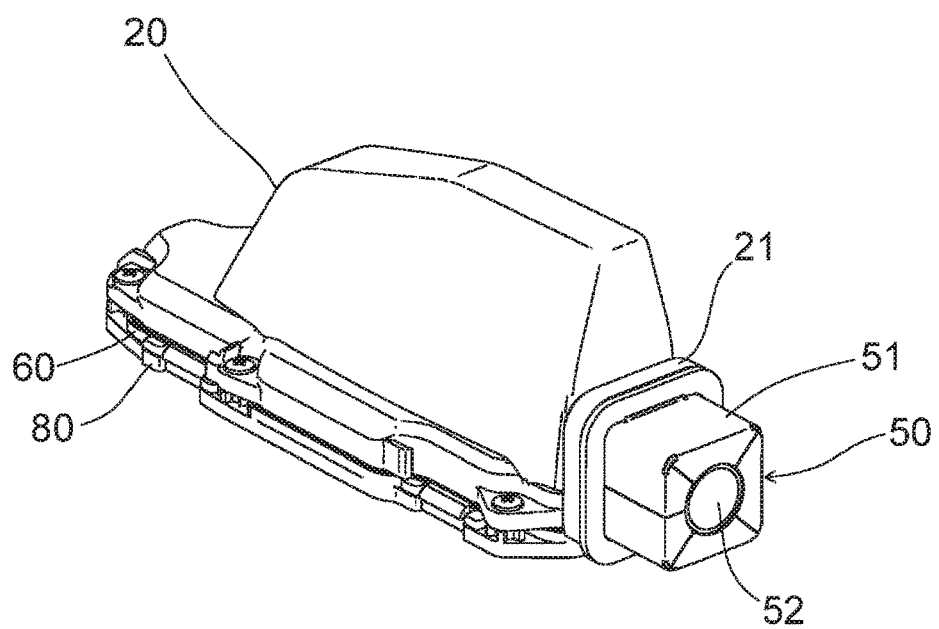
FIG. 4 is a perspective view, as viewed from the rear side, of the antenna device 1 in which the outer case 10 is omitted.
Figure 5:
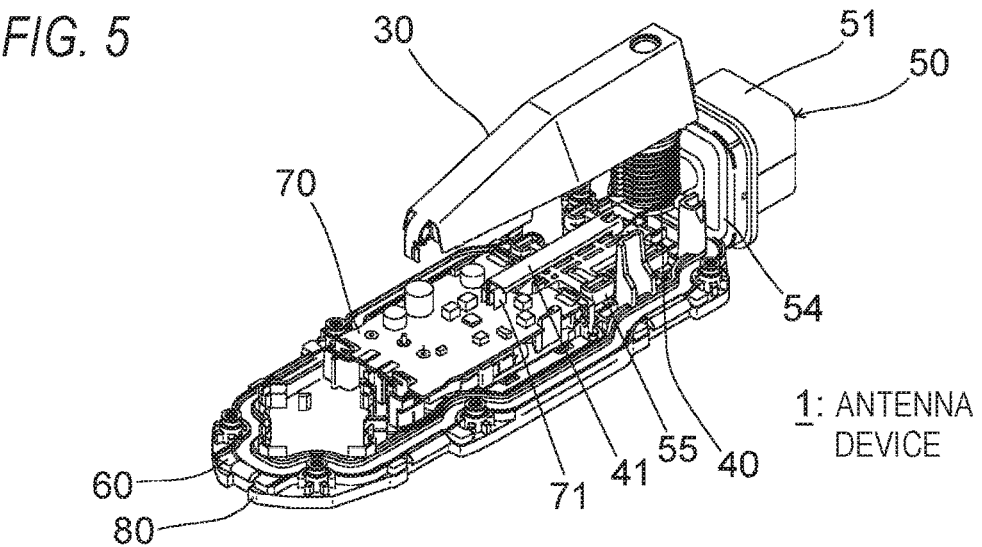
FIG. 5 is a perspective view, as viewed from the front side, of the antenna device 1 in which the outer case 10 and an inner case 20 are omitted.
Figure 6:
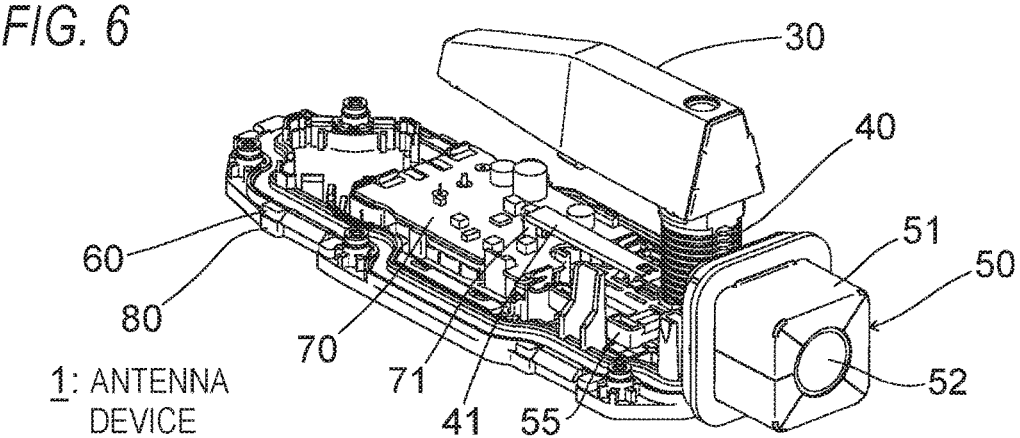
FIG. 6 is a perspective view, as viewed from the rear side, of the antenna device 1 in which the outer case 10 and the inner case 20 are omitted.

An inner case 20 is made of a synthetic resin (a mold product of such a resin as an ABS resin) through which radio waves is transmissive and is fixed to the antenna base 80 by screwing or the like. As shown in FIGS. 3 and 4, the inner case 20 has, at a rear-bottom position, a camera attachment portion 21 to which a camera 50 is attached. A pad 60, which is a ring-shaped elastic member made of elastomer, rubber, or the like, is disposed on the antenna base 80. The pad 60 is pressed along its entire circumference by a bottom end portion of the inner case 20, and thereby attains waterproof sealing between the inner case 20 and the antenna base 80.

Figure 7:
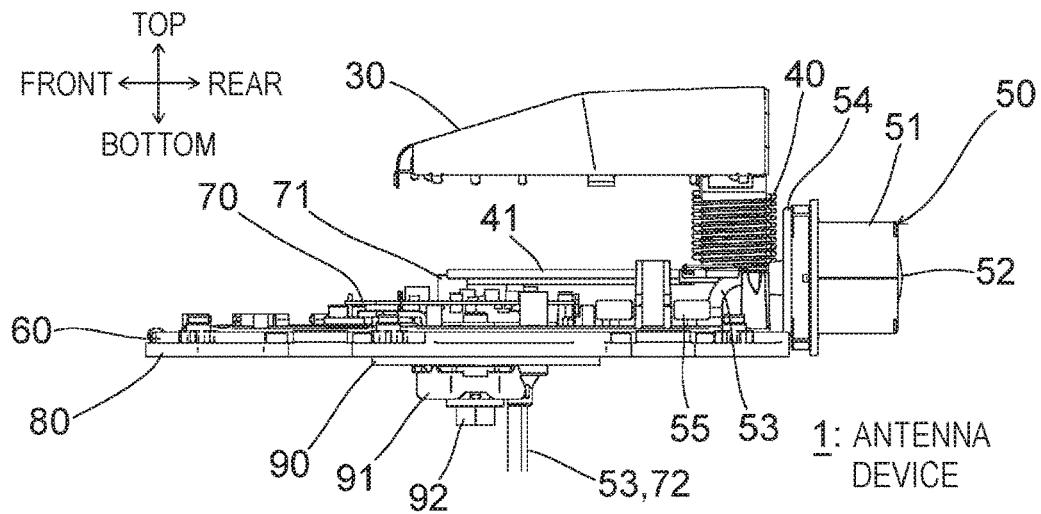
FIG. 7 is a side view of the antenna device 1 in which the outer case 10 and the inner case 20 are omitted.
Figure 8:
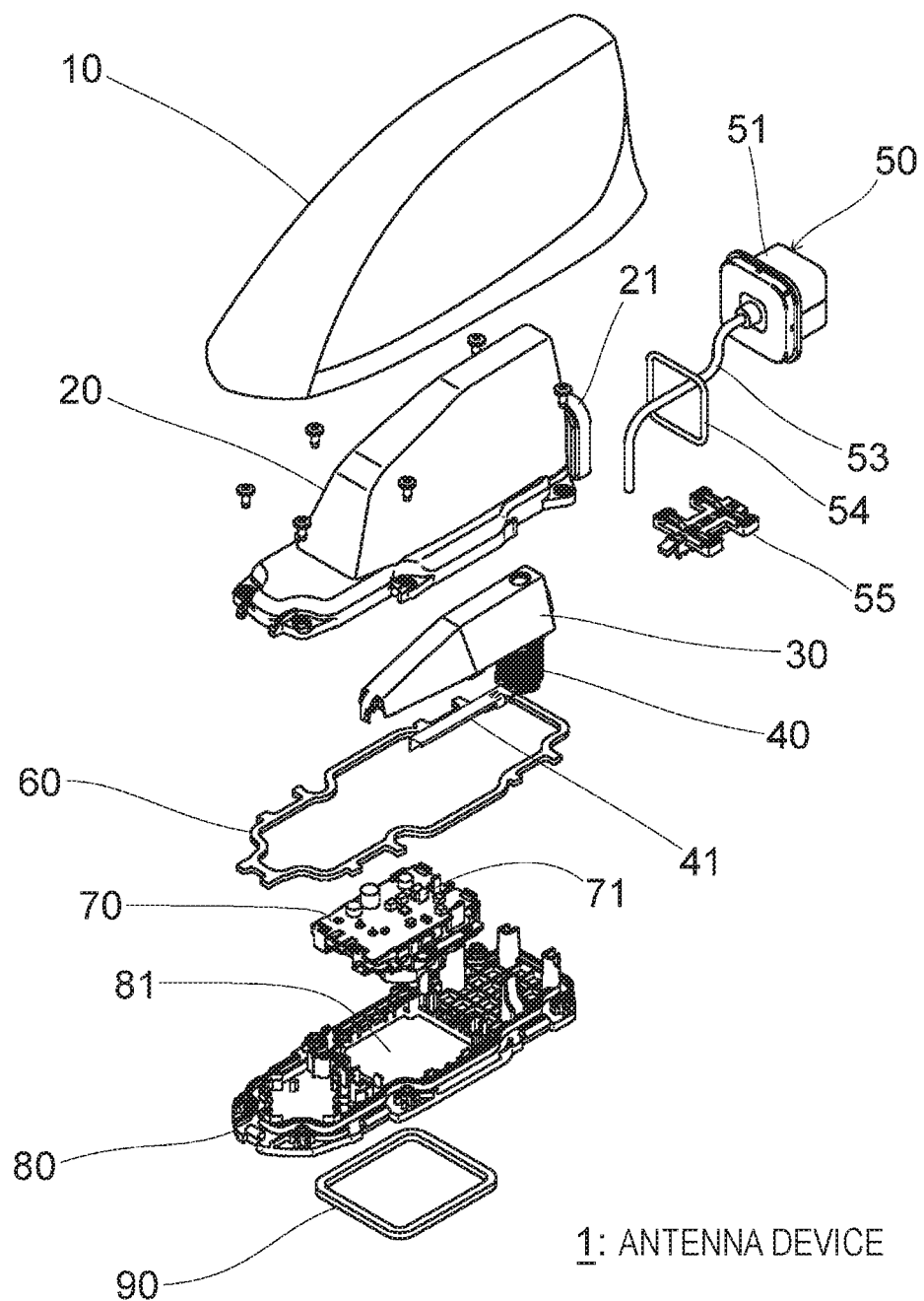
FIG. 8 is an exploded perspective view of the antenna device 1.
Figure 9:
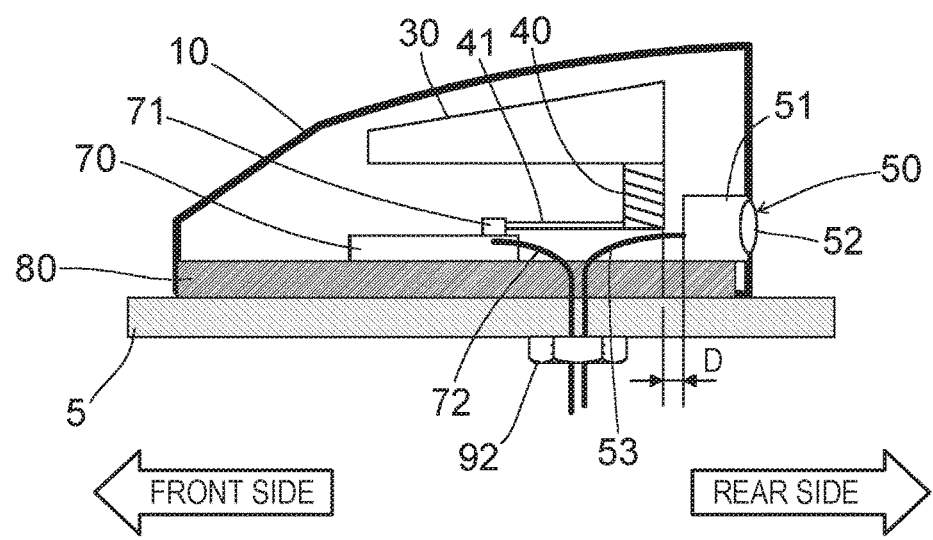
FIG. 9 is a schematic side sectional view of the antenna device 1 and a vehicle roof 5 as an attachment destination (the inner case 20 is omitted).

A top element 30 is a capacitance element formed with a metal plate (conductor plate) of stainless steel or the like. The top element 30 is formed into a flat plate shape, an umbrella shape, a U shape, a V shape, or the like, and is fixed to a ceiling wall of the inner case 20. A coil 40, which is an example wavelength shortening element, is disposed under (right under) a rear end portion of the top element 30. A top end of the winding of the coil 40 is located above a top end of a casing 51 of a camera 50. A bottom end of the winding of the coil 40 is located above a bottom end of the casing 51. A lower terminal 41 of the coil 40 is connected to an amplifier board 70. An upper terminal (not shown) of the coil 40 is connected to the top element 30. As shown in FIGS. 7 and 9, the coil 40 is disposed close to the casing 51 of the camera 50 (described later) in the front-rear direction (an example of a predetermined direction that is perpendicular to the vertical direction). The top element 30 and the coil 40 enable reception of AM/FM broadcast.

The camera 50 as an electronic device is attached (fixed) to the camera attachment portion (electronic device attachment portion) 21 which is formed as a rear wall portion of the inner case 20, and takes a moving image and/or a still image of a scene in a rear of the vehicle which is an attachment destination. The camera 50 includes a metal casing 51, a lens 52 which faces the rear side, and a signal line 53. The casing 51 is disposed at such a position as not to be right under the top element 30. The signal line 53 leads into the inner case 20 past the camera attachment portion 21 of the inner case 20. As shown in FIG. 7, the signal line 53 leads out downward through a through-hole 81 (see FIG. 8) of the antenna base 80 together with an output cable 72 which extends from the amplifier board 70. A pad 54, which is a ring-shaped elastic member made of elastomer, rubber, or the like, is sandwiched between the casing 51 of the camera 50 and the camera attachment portion 21 of the inner case 20, pressed, and thereby closes the space between them watertightly.

The antenna base 80 is made of resin and has the through-hole 81 at a central position. The amplifier board 70 is fixed to the antenna base 80 from above by screwing or the like so as to cover the top opening of the through-hole 81. A pair of conductor leaf springs (terminals) 71 between which the lower terminal 41 of the coil 40 is sandwiched are disposed on the amplifier board 70. A ring-shaped sealing member 90 which is a ring-shaped elastic member made of elastomer, rubber, or the like is disposed on the bottom surface of the antenna base 80 so as to surround the through-hole 81. The sealing member 90 seals, watertightly, the space between the antenna base 80 and the vehicle roof (i.e., the attachment surface for the antenna device 1). A washer 91 and a bolt 92 serve to attach the antenna device 1 to the vehicle roof (attachment destination). The antenna base 80 is grounded to the vehicle roof via the washer 91 and the bolt 92.

Figure 10:
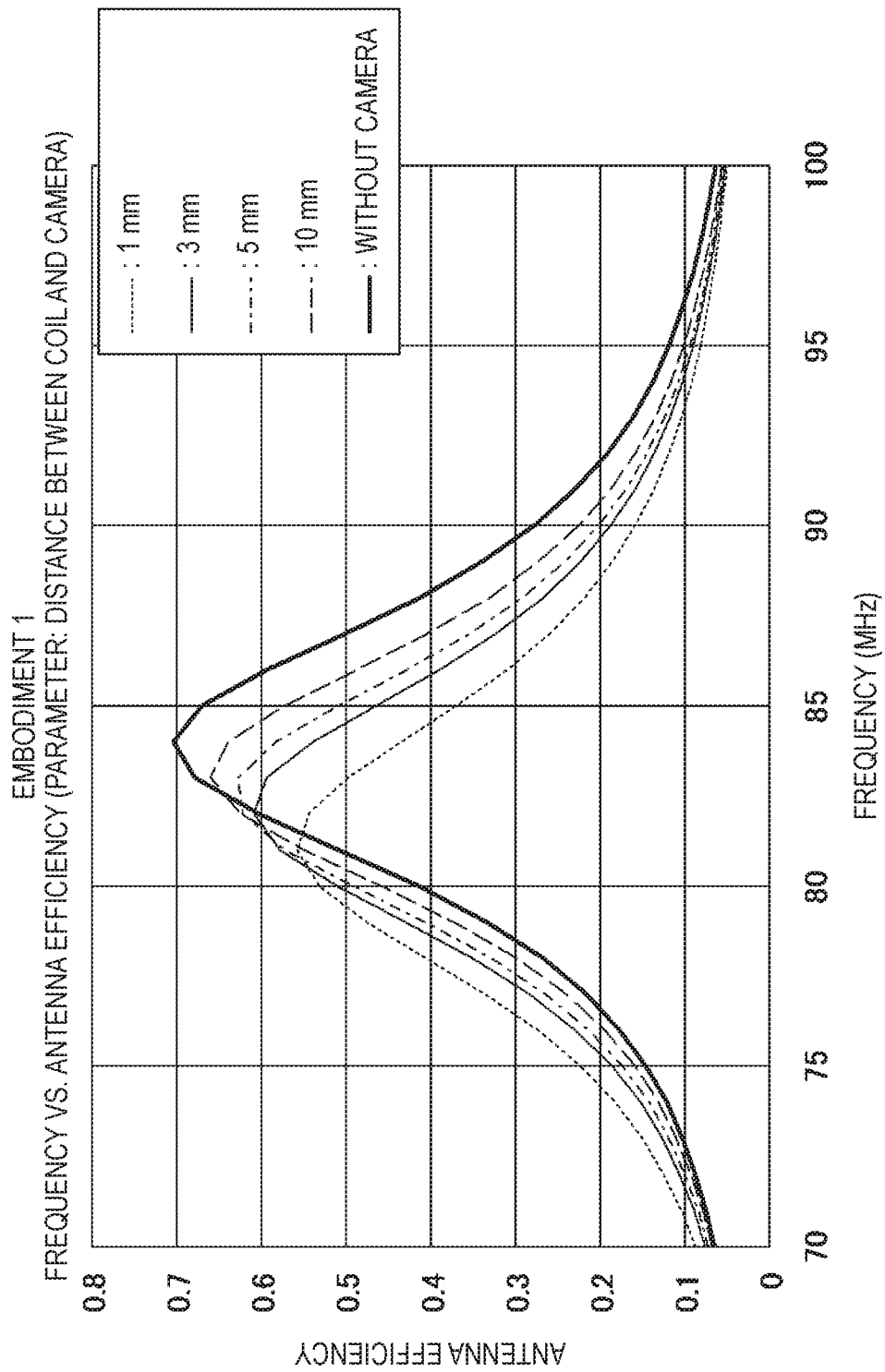
FIG. 10 is a characteristic diagram showing antenna efficiency curves in an FM band frequency range in conditions that the opposed distance (the distance D shown in FIG. 9) between a coil 40 and a casing 51 of a camera 50 is set at 1 mm, 3 mm, 5 mm, and 10 mm in the antenna device 1 as well as a case where the camera 50 is provided.
Figure 11:
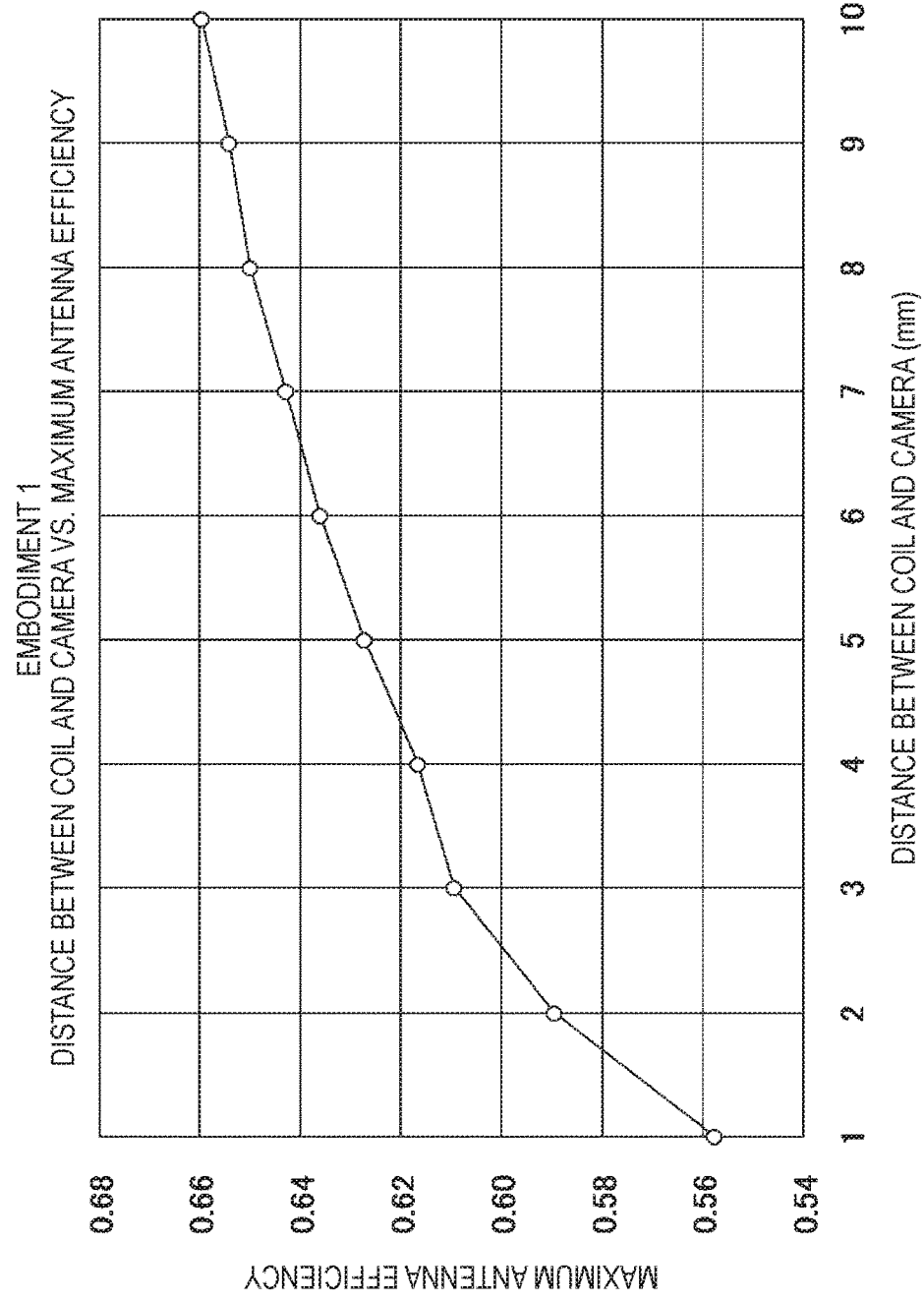
FIG. 11 is a characteristic diagram showing the FM band maximum antenna efficiency with respect to the opposed distance (the distance D shown in FIG. 9) between the coil 40 and the casing 51 of the camera 50 in the antenna device 1.
Figure 12:
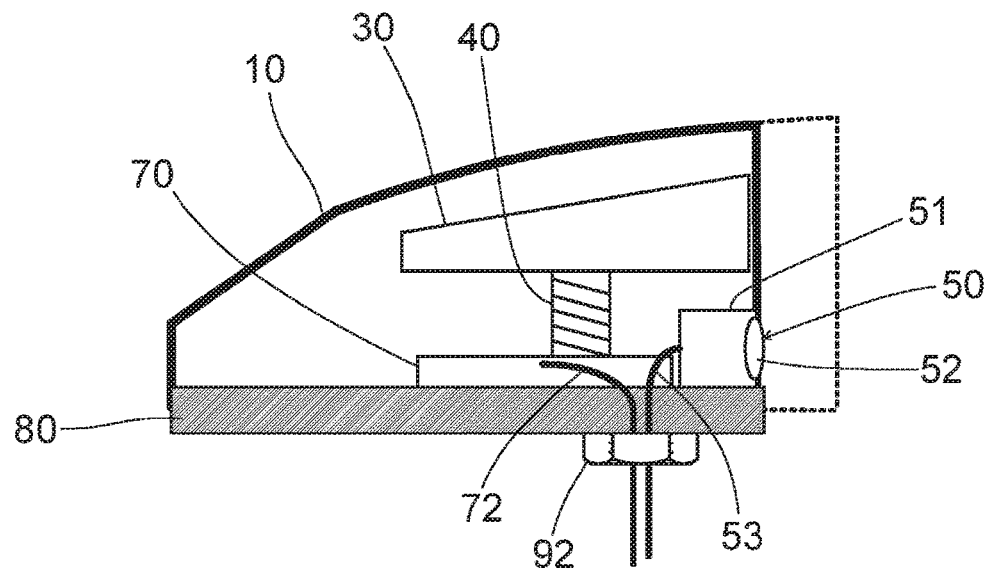
FIG. 12 is a schematic side sectional view of an antenna device 2 according to a second embodiment of the present invention (the inner case 20 is omitted).

FIG. 10 is a characteristic diagram showing antenna efficiency (radiation efficiency) curves in an FM band frequency range in conditions that the opposed distance (the distance D shown in FIG. 9) between the coil 40 and the casing 51 of the camera 50 is set at 1 mm, 3 mm, 5 mm, and 10 mm in the antenna device 1 as well as a case without the camera 50. FIG. 11 is a characteristic diagram showing the FM band maximum antenna efficiency with respect to the opposed distance (the distance D shown in FIG. 9) between the coil 40 and the casing 51 of the camera 50 in the antenna device 1.

It is seen from FIGS. 10 and 11 that the maximum antenna efficiency (i.e., the top of each mountain-shaped characteristic shown in FIG. 10) is the highest in a case where the camera 50 is not provided and lowers as the opposed distance D between the coil 40 and the casing 51 of the camera 50 decreases. It was found that where the opposed distance D is longer than or equal to 2.5 mm, the antenna characteristic variation is suppressed, and the antenna efficiency is 85% or more (higher than or equal to about 0.6; performance good for practical use) with an antenna efficiency 0.7 in a case where the camera 50 is not provided. The frequency at which the mountain-shaped characteristic shown in FIG. 10 has a peak depends on the opposed distance; however, what is important is the peak value of a mountain-shaped characteristic because adjustment can be made by tuning. The distance 2.5 mm is about 0.00075 times the shortest wavelength of a reception target signal (in this case, FM signal).

Where the camera 50 is provided in the antenna device 1, it is usually fundamental that the camera 50 and the coil 40 be apart from each other as much as possible to suppress adverse effects of the casing 51 which is a metal object on the antenna performance. However, the embodiment has made apparent that the casing 51 of the camera 50 and the coil 40 can be disposed close to each other to such an extent that the distance between them is as small as 0.00075 times the shortest wavelength of a reception target signal. That is, according to the present embodiment, the influence on the antenna performance can be suppressed even if the camera 50 is provided in the vicinity of the coil 40. Furthermore, the layout that has been unconceivable conventionally, that is, the coil 40 is disposed right under the rear end portion of the top element 30 though the camera 50 is disposed in the rear portion of the antenna device 1, is made possible. The degree of freedom of designing can thus be increased to a large extent.

Embodiment 2

A second embodiment of the present invention will be described with reference to FIGS. 12-15. A broken line shown in FIG. 12 behind an outer case 10 describes, as a reference, the external shape of the outer case 10 employed in the first embodiment. An antenna device 2 according to the embodiment is the same as the antenna device 1 according to the first embodiment except that the casing 51 of the camera 50 is disposed right under a rear end portion of the top element 30 and the size of the outer case 10 is reduced accordingly, and that the coil 40 is disposed right under a central portion of the top element 30.

Figure 13:
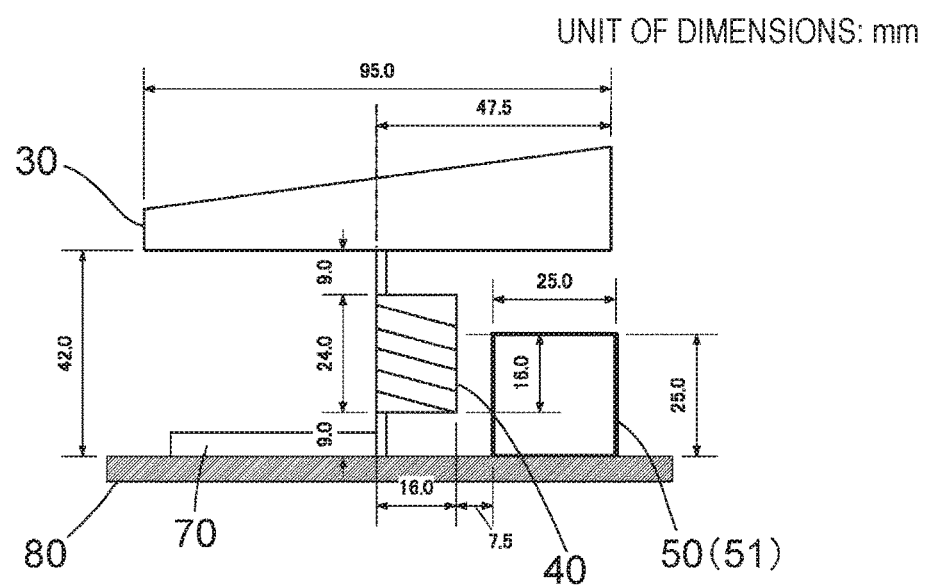
FIG. 13 is an explanatory diagram showing example dimensions (unit: mm) of the antenna device 2.

FIG. 13 is an explanatory diagram showing example dimensions (unit: mm) of the antenna device 2. In the example of FIG. 13, the front-rear length of the top element 30 is 95.0 mm, the distance from the front end of the winding of the coil to the rear end of the top element 30 is 47.5 mm, the length of the winding of the coil 40 in the winding axis direction is 24.0 mm, the distance from the top end of the coil 40 to the bottom end of the top element 30 is 9.0 mm, the distance from the bottom end of the coil 40 to the top surface of the antenna base 80 is 9.0 mm, the distance from the top surface of the antenna base 80 to the bottom end of the top element 30 is 42.0 mm, the outer diameter of the winding of the coil 40 is 16.0 mm, and the distance from the rear end of the winding of the coil 40 to the front surface of the casing 51 of the camera 50 is 7.5 mm. The overlap length of the casing 51 and the coil 40 in the height direction is 16.0 mm. The front-rear length of the casing 51 is 25.0 mm and the height of the casing 51 is 25.0 mm. The external dimensions of the casing 51 are common to all embodiments, the external dimensions of the winding of the coil 40 also apply to the first embodiment and a third embodiment (FIG. 16), and the dimensions relating to relative positioning between the coil 40 and the casing 51 in the height direction also apply to the first embodiment.

Figure 14:
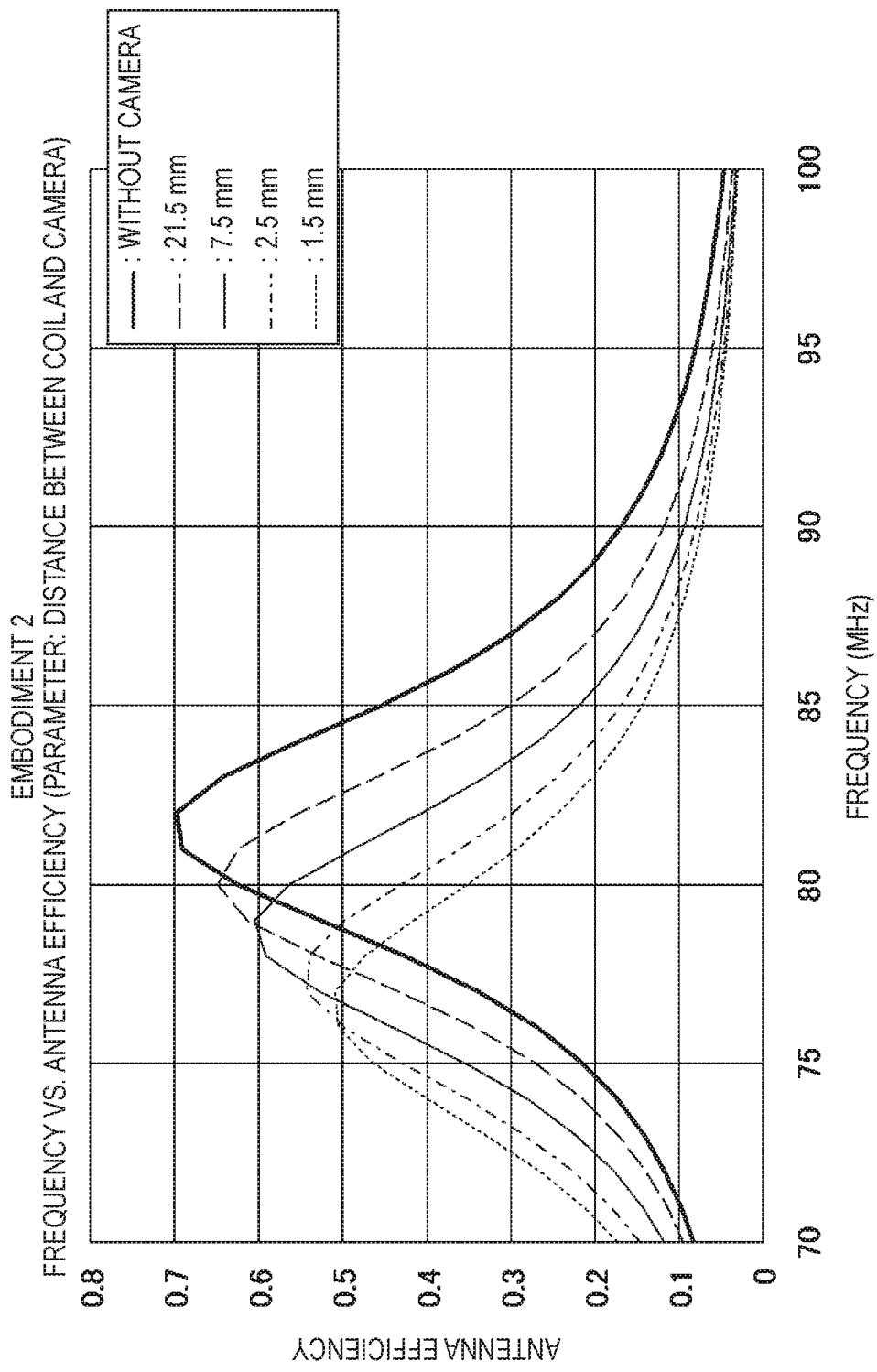
FIG. 14 is a characteristic diagram showing antenna efficiency curves in an FM band frequency range in conditions that the opposed distance between the coil 40 and the casing 51 of the camera 50 is set at 1.5 mm, 2.5 mm, 7.5 mm, and 21.5 mm in the antenna device 2 as well as a case without the camera 50.
Figure 15:
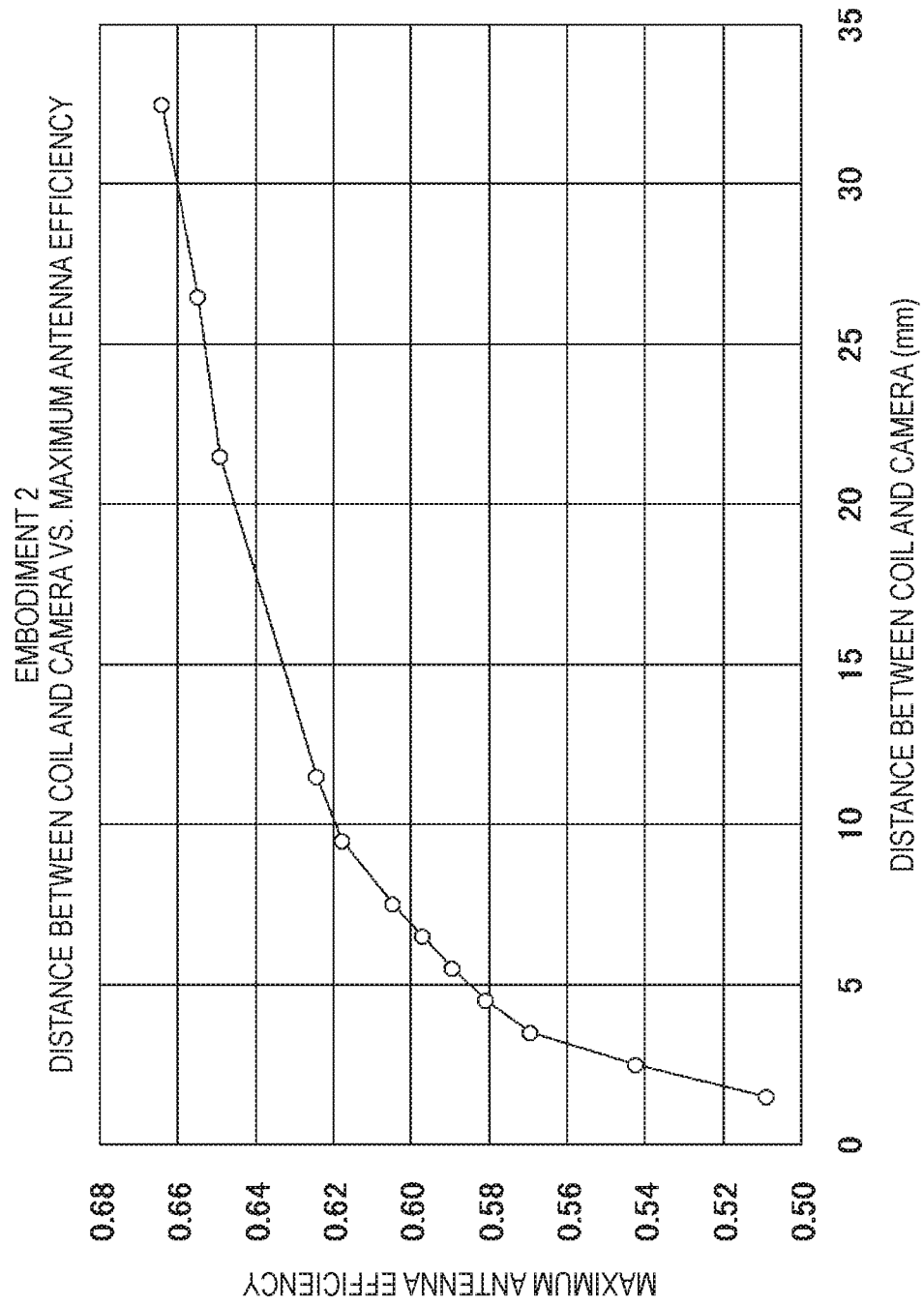
FIG. 15 is a characteristic diagram showing the FM band maximum antenna efficiency with respect to the confrontation distance between the coil 40 and the casing 51 of the camera 50 in the antenna device 2.

FIG. 14 is a characteristic diagram showing antenna efficiency curves in an FM band frequency range in conditions that the opposed distance between the coil 40 and the casing 51 of the camera 50 is set at 1.5 mm, 2.5 mm, 7.5 mm, and 21.5 mm in the antenna device 2 as well as a case without the camera 50. FIG. 15 is a characteristic diagram showing the FM band maximum antenna efficiency with respect to the opposed distance between the coil 40 and the casing 51 of the camera 50 in the antenna device 2.

It is seen from FIGS. 14 and 15 that the maximum antenna efficiency (i.e., the top of each mountain-shaped characteristic shown in FIG. 14) is the highest in a case where the camera 50 is not provided and lowers as the opposed distance between the coil 40 and the casing 51 of the camera 50 decreases. It was found that where the opposed distance is longer than or equal to 7.5 mm, the antenna characteristic variation is suppressed, and the antenna efficiency is 85% or more (higher than or equal to about 0.6; performance good for practical use) with an antenna efficiency 0.7 in a case where the camera 50 is not provided. The distance 7.5 mm is about 0.0023 times the shortest wavelength of a reception target signal (in this case, FM signal).

Where the camera 50 is provided in the antenna device 2, it is usually fundamental that the casing 51 which is a metal object be disposed at such a position as not to be right under the top element 30 to suppress adverse effects of the casing 51 on the antenna performance. However, the present embodiment has made apparent that the casing 51 can be disposed right under the top element 30 by making the distance between the casing 51 of the camera 50 and the coil 40 longer than or equal to 0.0023 times the shortest wavelength of a reception target signal. That is, according to the present embodiment, the influence on the antenna performance can be suppressed even if the camera 50 is disposed close to the coil 40 to such an extent that the distance between them is as small as 0.0023 times the shortest wavelength of a reception target signal. Furthermore, the layout that has been difficult to realize conventionally, that is, at least a part of the casing 51 of the camera 50 is disposed right under the top element 30, is made possible. The degree of freedom of designing can thus be increased to a large extent.

Embodiment 3

Figure 16:
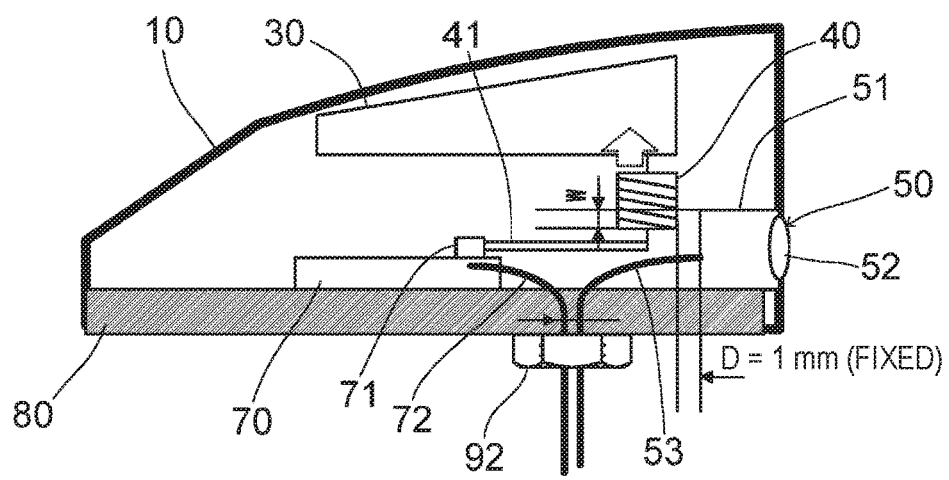
FIG. 16 is a schematic side sectional view of an antenna device 3 according to a third embodiment of the present invention (the inner case 20 is omitted).

A third embodiment of the present invention will be described with reference to FIGS. 16-18. In an antenna device 3 according to the present embodiment, the bottom end of the winding of the coil 40 is shifted upward from its position in the antenna device 1 according to the first embodiment. A opposed distance 1 mm between the coil 40 and the casing 51 is about 0.00030 times the shortest wavelength of a reception target signal (in this case, FM signal) and is shorter than the opposed distance in the first embodiment.

Figure 17:
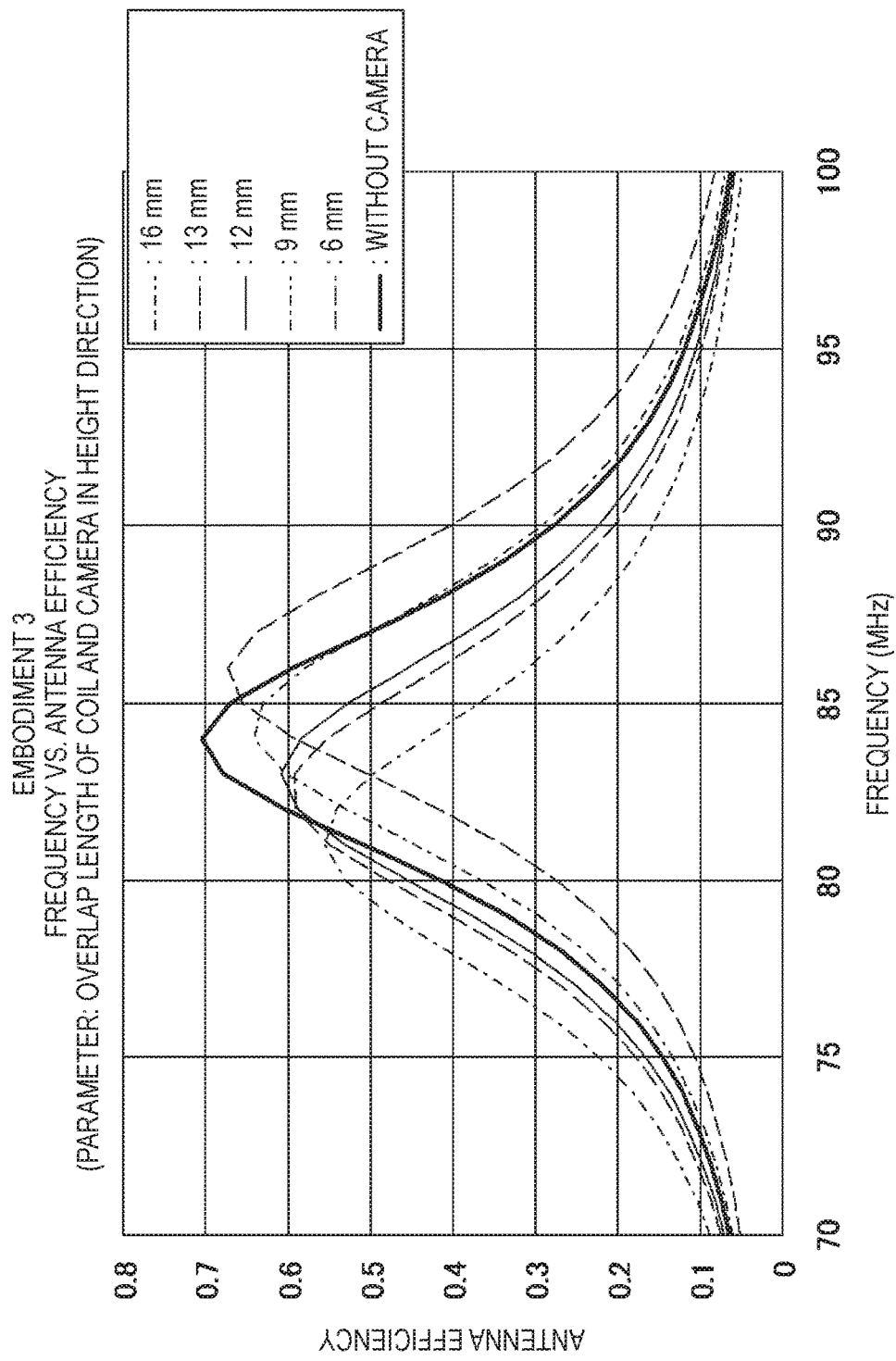
FIG. 17 is a characteristic diagram showing antenna efficiency curves in an FM band frequency range in conditions that in the antenna device 3 the opposed distance (the distance D shown in FIG. 16) between the coil 40 and the casing 51 of the camera 50 is fixed at 1 mm and the overlap length (the length W shown in FIG. 16) of the coil 40 and the casing 51 in the height direction is set at 6 mm, 9 mm, 12 mm, 13 mm, and 16 mm as well as a case without the camera 50.

FIG. 17 is a characteristic diagram showing antenna efficiency curves in an FM band frequency range in cases that in the antenna device 3 the opposed distance (the distance D shown in FIG. 16) between the coil 40 and the casing 51 of the camera 50 is fixed at 1 mm and the overlap length (the length W shown in FIG. 16) of the coil 40 and the casing 51 in the height direction is set at 6 mm, 9 mm, 12 mm, 13 mm, and 16 mm as well as a case without the camera 50. FIG. 18 is a characteristic diagram showing the FM band maximum antenna efficiency with respect to the overlap length (the length W shown in FIG. 16) of the coil 40 and the casing 51 in the height direction in the antenna device 3.

Figure 18:
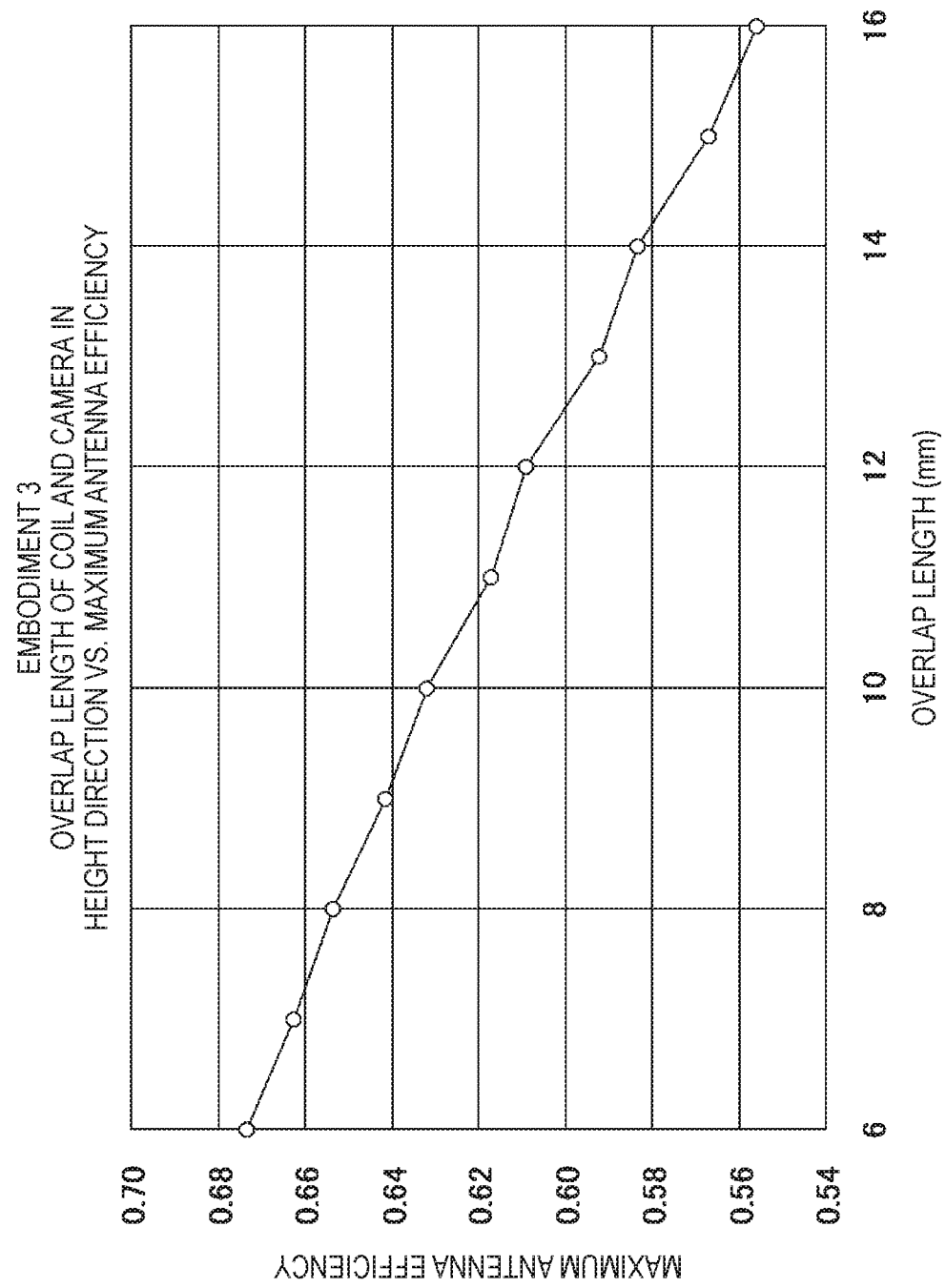
FIG. 18 is a characteristic diagram showing the FM band maximum antenna efficiency with respect to the overlap length (the length W shown in FIG. 16) of the coil 40 and the casing 51 in the height direction in the antenna device 3.

It is seen from FIGS. 17 and 18 that the maximum antenna efficiency (i.e., the top of each mountain-shaped characteristic shown in FIG. 17) is the highest in a case where the camera 50 is not provided and lowers as the overlap length of the coil 40 and the casing 51 in the height direction increases. It was found that where the overlap length is shorter than or equal to 12.5 mm, the antenna characteristic variation is suppressed, and the antenna efficiency is 85% or more (higher than or equal to about 0.6; performance good for practical use) with an antenna efficiency 0.7 in a case where the camera 50 is not provided. The distance 12.5 mm is about 0.0038 times the shortest wavelength of a reception target signal (in this case, FM signal).

Figure 19:
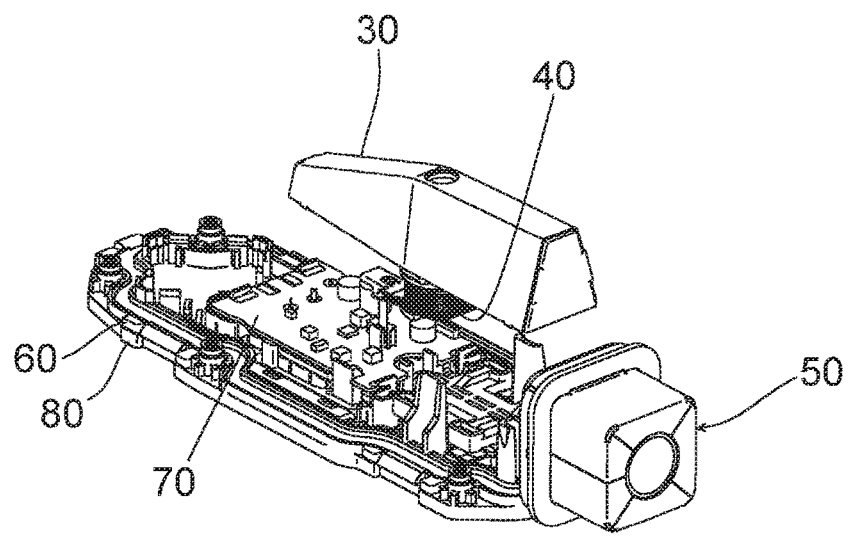
FIG. 19 is a perspective view, as viewed from the rear side, of the antenna device 3 in which the bottom end of the winding of the coil 40 is shifted upward by shortening the winding pitch of the coil 40.
Figure 20:
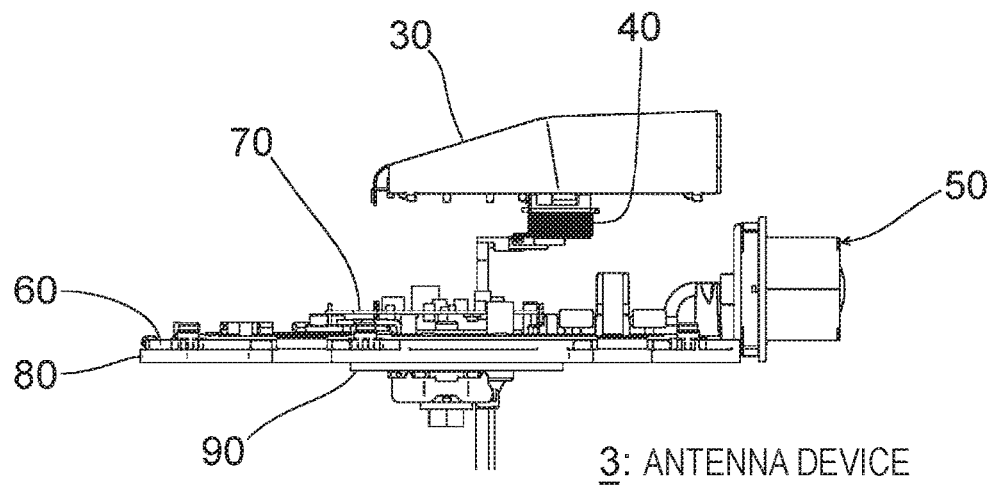
FIG. 20 is a side view of the antenna device 3 in which the bottom end of the winding of the coil 40 is shifted upward by shortening the winding pitch of the coil 40.
Figure 21:
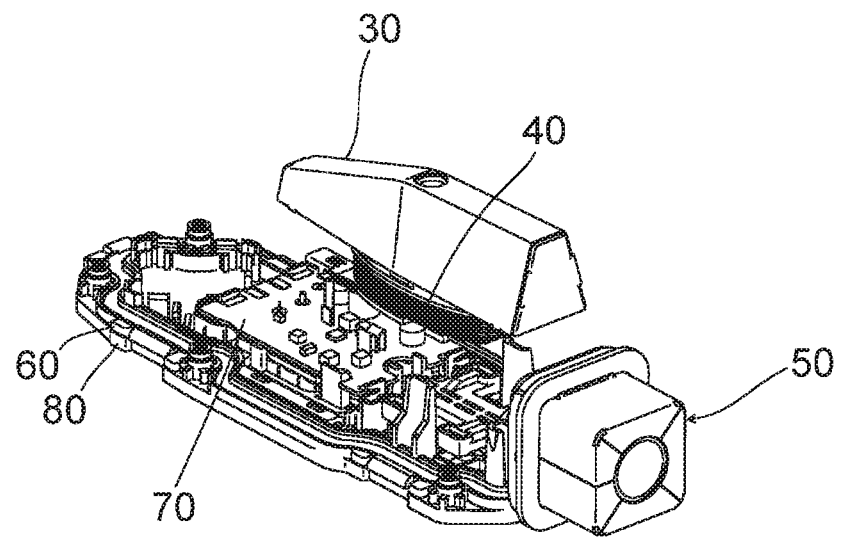
FIG. 21 is a perspective view, as viewed from the rear side, of the antenna device 3 in which the bottom end of the winding of the coil 40 is shifted upward by increasing the diameter of the coil 40.
Figure 22:
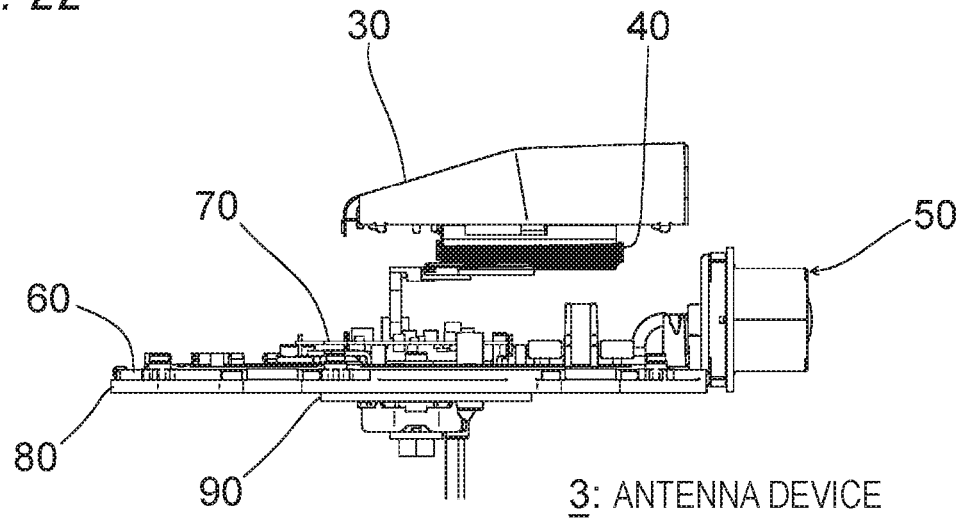
FIG. 22 is a side view of the antenna device 3 in which the bottom end of the winding of the coil 40 is shifted upward by increasing the diameter of the coil 40.

According to the present embodiment, as in the first embodiment, the influence on the antenna performance can be suppressed even if the camera 50 is provided in the vicinity of the coil 40. Furthermore, the coil 40 and the casing 51 of the camera 50 can be disposed even closer to each other than in the first embodiment. The degree of freedom of designing can thus be increased further. Example ways for shifting the bottom end of the winding of the coil 40 upward are a method that as shown in FIGS. 19 and 20 the winding pitch of the coil 40 is made smaller than that in the first embodiment and a method that as shown in FIGS. 21 and 22 the diameter of the coil 40 is made larger than that in the first embodiment. The diameter of the coil 40 may be increased by employing an elliptical bobbin as a winding core that is long in the front-rear direction.

Although the present invention has been described above using the embodiments as examples, it would be understood by those skilled in the art that each constituent element and each step of the process of each embodiment can be modified in various manners within the scope of the claims. Modifications will be described below.

Although the embodiments are directed to an example that the antenna device has a shark fin shape, the antenna device may be of another form such as a pole antenna form. Instead of the coil 40, the wavelength shortening element may be a distributed constant element having a meandering shape, a fractal shape, a spiral shape, or the like or another type of element having a wavelength shortening function and an antenna resonance frequency adjusting function such as a lumped constant element (e.g., chip coil). The casing 51 of the camera 50 is not necessary to be made of a metal; for example, a structure is possible that a metal shield is formed inside a resin casing. In electronic devices, it is obvious that the casing encloses a metal even if it is not a metal casing: the metal enclosed in the casing influences the antenna performance as in the case of a metal casing.

Figure 23:
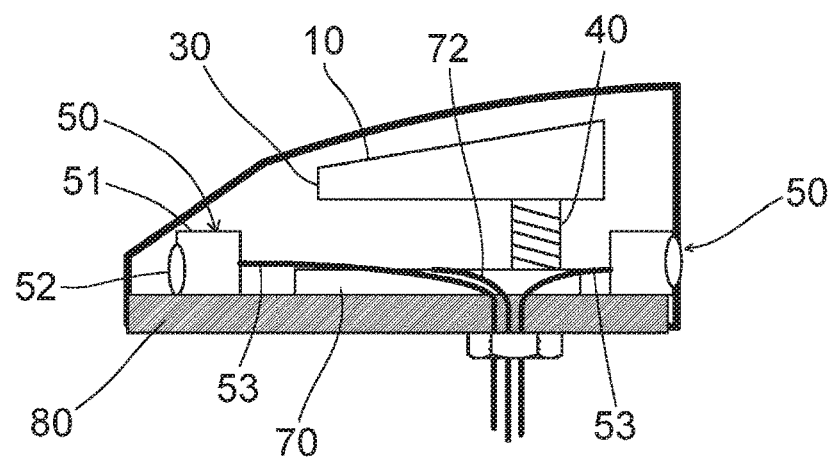
FIG. 23 is a schematic side view of an antenna device according to an embodiment in which an additional camera 50 is disposed at a front position in the outer case 10 in the configuration in which the coil 40 is disposed below a rear portion of the top element 30 as shown in FIG. 9 (the inner case 20 is omitted).
Figure 24:
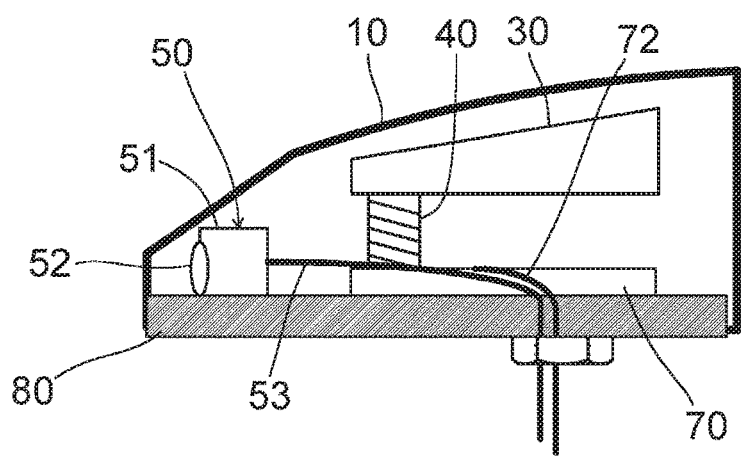
FIG. 24 is a schematic side view of an antenna device according to an embodiment in which the camera 50 is moved to a front position in the outer case 10 and the coil 40 is moved to under (right under) a front end portion of the top element 30 in the configuration shown in FIG. 9 (the inner case 20 is omitted).
Figure 25:
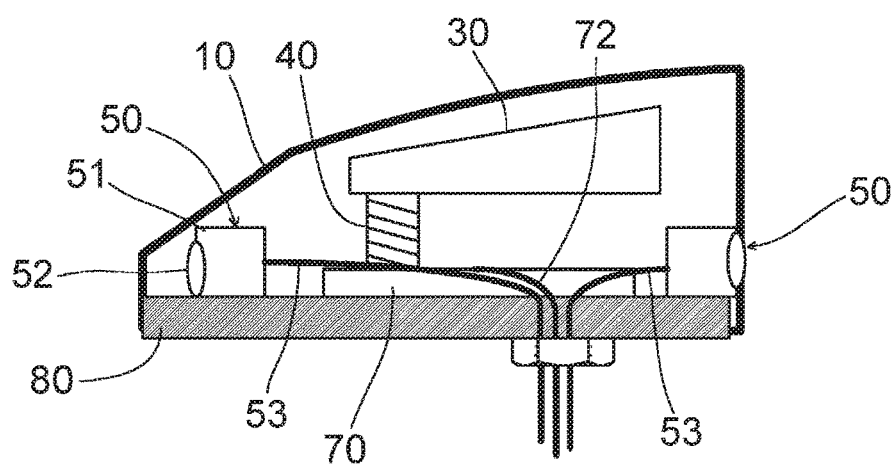
FIG. 25 is a schematic side view of an antenna device according to an embodiment in which an additional camera 50 is disposed below (right under) a rear end portion of the top element 30 in the configuration shown in FIG. 24 (the inner case 20 is omitted).

Two or more cameras 50 may be provided. For example, as shown in FIG. 23, an additional camera 50 may be disposed at a front position in the outer case 10. A configuration shown in FIG. 24 is possible in which the coil 40 is disposed under (right under) a front end portion of the top element 30 and the camera 50 is disposed in a front portion of the outer case 10. Furthermore, as shown in FIG. 25, an additional camera 50 may be disposed below (right under) a rear end portion of the top element 30 in the configuration shown in FIG. 24. Also, a camera(s) 50 may be disposed at a side position (left and right side positions) in the outer case 10. The electronic device is not limited to a camera and may be another type of device such as a human sensor for a protection against theft, an LED, a speaker, or an infrared sensor. The present invention is effective in incorporating, in an antenna device, any of a broad range of electronic devices that may affect the characteristics of the antenna when installed in its vicinity.

Description Of Symbols 1-3: Antenna device; 5: Vehicle roof; 10: Outer case; 20: Inner case; 21: Camera attachment portion (electronic device attachment portion); 30: Top element (capacitance element); 40: Coil; 41: Lower terminal; 50: Camera (electronic device); 51: Casing; 52: Lens; 53: Signal line; 54: Pad; 55: Base; 60: Pad; 70: Amplifier board; 71: Conductor leaf spring (terminal); 72: Output cable; 80: Antenna base; 81: Through-hole; 90: Sealing member; 91: Washer; 92: Bolt.

The invention claimed is:

1. An antenna device comprising:
   a top element;
   a wavelength shortening element made of metal and disposed below the top element in a vertical direction; and
   a casing of a camera.

2. The antenna device according to claim 1, wherein the casing is disposed at a position which is not right under the top element,
   wherein the wavelength shortening element is disposed close to the casing in a predetermined direction that is perpendicular to a vertical direction, and
   wherein a maximum antenna efficiency in a predetermined frequency band is higher than or equal to 85% of a maximum antenna efficiency in a case where the camera is not provided.

3. The antenna device according to claim 1, wherein the casing is disposed at a position which is not right under the top element,
   wherein the wavelength shortening element is disposed close to the casing in a predetermined direction that is perpendicular to a vertical direction, and
   wherein a distance between the casing and the wavelength shortening element in the predetermined direction is longer than or equal to 0.00075 times a shortest wavelength of a reception target signal.

4. The antenna device according to claim 1, wherein at least a part of the casing is disposed right under the top element,
   wherein the wavelength shortening element is disposed so as to be spaced from the casing by a predetermined distance in a predetermined direction that is perpendicular to a vertical direction, and
   wherein a maximum antenna efficiency in a predetermined frequency band is higher than or equal to 85% of a maximum antenna efficiency in a case where the camera is not provided.

5. The antenna device according to claim 1, wherein at least a part of the casing is disposed right under the top element,
   wherein the wavelength shortening element is disposed so as to be spaced from the casing by a predetermined distance in a predetermined direction that is perpendicular to a vertical direction, and
   wherein a distance between the casing and the wavelength shortening element in the predetermined direction is longer than or equal to 0.0023 times a shortest wavelength of a reception target signal.

6. The antenna device according to claim 1, wherein a top end of the wavelength shortening element is located above a top end of the casing, and a bottom end of the wavelength shortening element is located above a bottom end of the casing.

7. The antenna device according to claim 6, wherein the casing is disposed at a position which is not right under the top element,
   wherein the wavelength shortening element is disposed close to the casing in a predetermined direction that is perpendicular to a vertical direction,
   wherein an overlap length of the wavelength shortening element and the casing in the vertical direction is shorter than or equal to 0.0038 times a shortest wavelength of a reception target signal, and
   wherein a distance between the casing and the wavelength shortening element in the predetermined direction is longer than or equal to 0.00030 times the shortest wavelength of the reception target signal.

8. The antenna device according to claim 1, wherein the wavelength shortening element is located at a position which is right under a central portion of the top element or at a position which is closer to the casing than the position right under the central portion of the top element.

9. The antenna device according to claim 1, wherein the casing is made of a metal.

10. The antenna device according to claim 1, wherein the top element and the wavelength shortening element are connected in series.

11. The antenna device according to claim 1, wherein the casing further comprises a resin element in which a metal shield is formed.

12. A roof mounted device for a vehicle comprising:
    a base configured to be operably coupled with a roof of the vehicle;
    an outer case operably coupled with the base;
    an inner case proximate the outer case and defining an inner cavity;
    a camera disposed in communication with an opening defined through the outer case; and
    a camera attachment portion disposed between the camera and the inner case.

13. The roof mounted device according to claim 12, wherein the camera attachment portion is configured to apply a force to the camera in a direction away from the inner case.

14. The roof mounted device according to claim 12, wherein the camera attachment portion forms a seal defining a sealing plane, and wherein the camera attachment portion is configured to apply a force acting in a direction normal to the sealing plane.

15. The roof mounted device according to claim 12, wherein a space is defined between the inner case and the outer case proximate the opening, and wherein at least a portion of the camera is disposed in the space.

16. The antenna device according to claim 12, wherein the camera attachment comprises a pad that watertightly closes a space between the camera and the camera attachment.

17. A roof mounted device for a vehicle comprising:
- a base configured to be operably coupled with a roof of the vehicle;
- a housing assembly operably coupled with the base;
- a camera disposed in the housing assembly and in communication with an opening defined through the housing assembly; and
- a camera attachment portion disposed between the camera and the housing assembly.

18. The roof mounted device according to claim 17, wherein the camera attachment portion is configured to apply a force to the camera in a direction away from the housing assembly.

19. The roof mounted device according to claim 17, wherein the camera attachment portion forms a seal defining a sealing plane, and wherein the camera attachment portion is configured to apply a force acting in a direction normal to the sealing plane.

20. The antenna device according to claim 17, wherein the camera attachment comprises a pad that watertightly closes a space between the camera and the camera attachment.

\* \* \* \* \*